US006810459B1

United States Patent
Griffin et al.

(10) Patent No.: US 6,810,459 B1
(45) Date of Patent: Oct. 26, 2004

(54) REDUCED COMPLEXITY COMPUTER SYSTEM ARCHITECTURE

(75) Inventors: Dwight D. Griffin, Hoffman Estates, IL (US); Timothy J. Collins, Lockport, IL (US); Patrick L. Rakers, Kildeer, IL (US); Michael J. Crowley, Oak Park, IL (US)

(73) Assignee: Motorola, Inc., Schaumburg, IL (US)

( * ) Notice: Subject to any disclaimer, the term of this patent is extended or adjusted under 35 U.S.C. 154(b) by 557 days.

(21) Appl. No.: 09/781,803

(22) Filed: Feb. 12, 2001

(51) Int. Cl.$^7$ .............................................. G06F 13/00
(52) U.S. Cl. ...................................... 710/305; 710/100
(58) Field of Search ............................... 710/100, 305, 710/110; 712/1

(56) References Cited

U.S. PATENT DOCUMENTS 4,774,652 A * 9/1988 Dhuey et al. ............... 711/202
5,572,695 A * 11/1996 Andrews et al. ............ 711/147
6,052,705 A * 4/2000 Iwase et al. ................ 708/521
6,591,167 B1 * 7/2003 Minowa et al. ............... 701/1
6,618,784 B1 * 9/2003 Schade ...................... 710/305

FOREIGN PATENT DOCUMENTS

WO    WO 90/07154    6/1990

* cited by examiner

Primary Examiner—Glenn A. Auve
(74) Attorney, Agent, or Firm—Val Jean F. Hillman; Valerie M. Davis

(57) ABSTRACT

An architecture for a computer system that has lower complexity than prior computer system architectures. In one embodiment the functionality that in prior computer system architectures resides in a central processing unit (CPU) is split between a CPU and a program control unit. This allows the CPU to have lower complexity and can permit the computer system to have greater flexibility and lower cost. In another embodiment the computer system contains a memory mapping unit. The memory mapping unit enables the computer system to use one of a plurality of peripherals without changing the instruction codes of the CPU thus increasing the flexibility of the computer system.

27 Claims, 6 Drawing Sheets

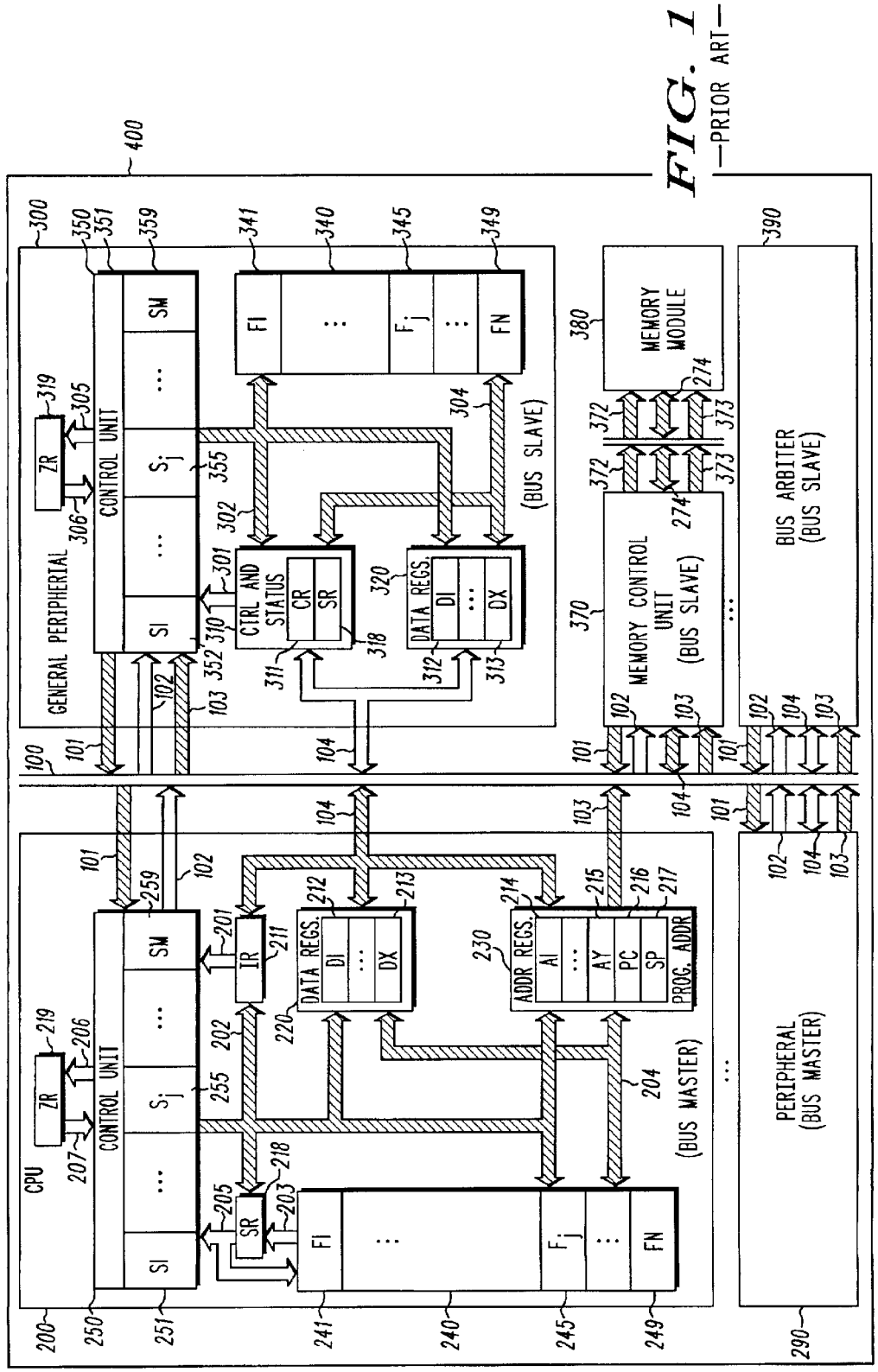
FIG. 1 —PRIOR ART—

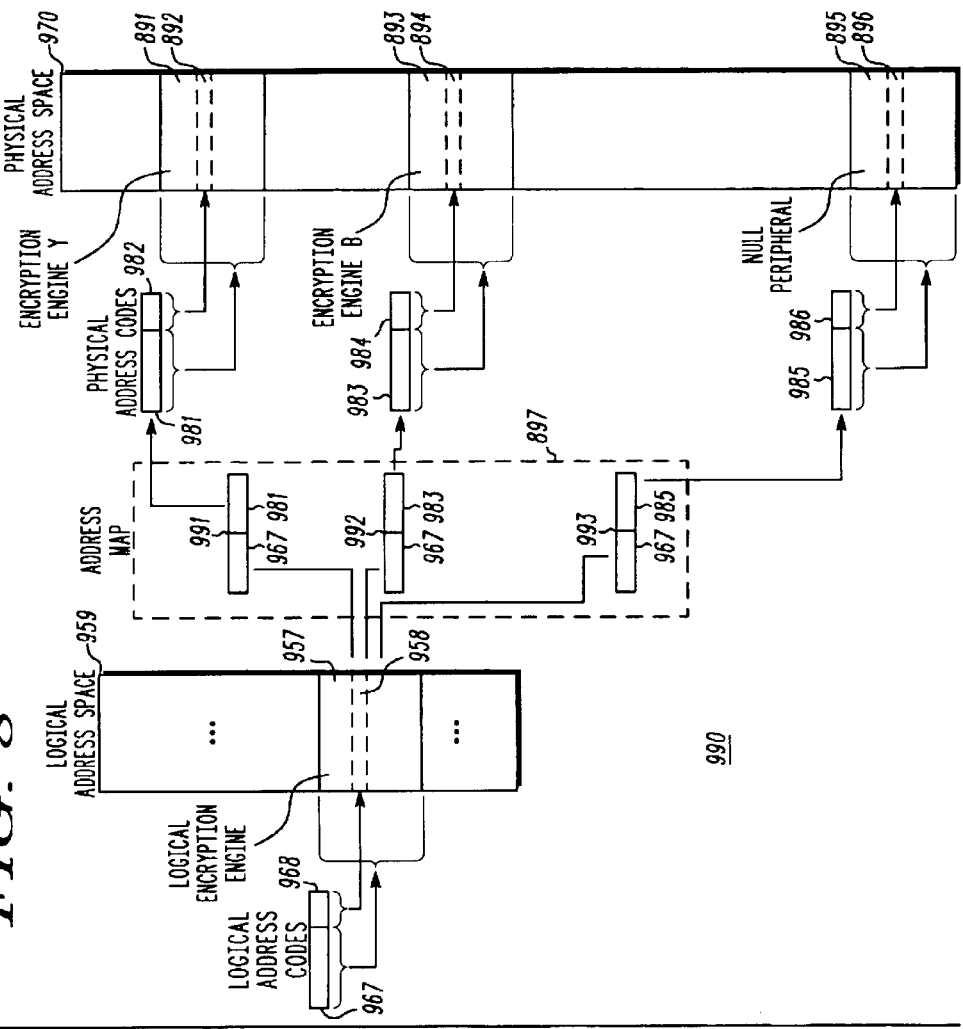
*FIG. 8*
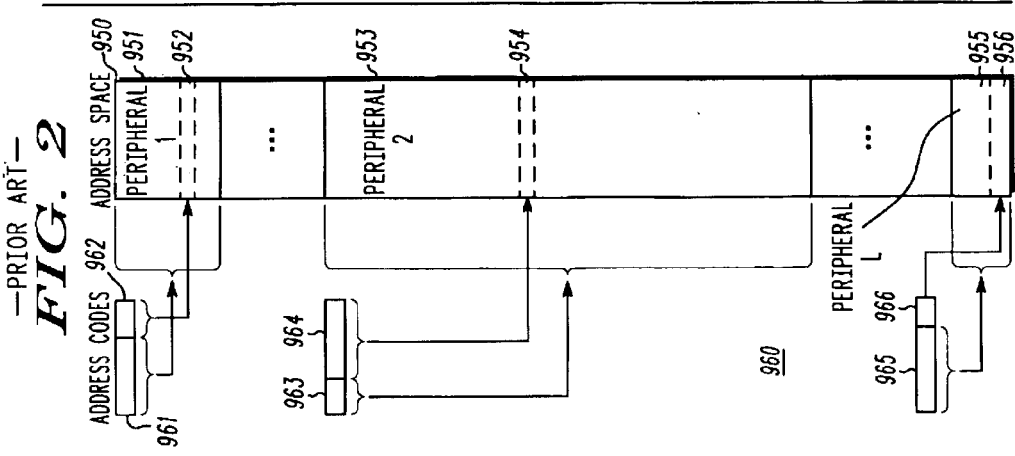
*FIG. 2* —PRIOR ART—

REDUCED COMPLEXITY COMPUTER SYSTEM ARCHITECTURE

FIELD OF THE INVENTION

This invention relates generally to computer systems, and more particularly, to the architecture of computer systems containing a central processing unit.

BACKGROUND OF THE INVENTION

Computer systems containing a central processing unit (CPU) are well known in the art. These systems may be found in many common devices such as, but not limited to, calculators, personal organizers, pagers, toys, smart cards, cellular phones, home and office appliances, consumer electronic devices, and the like. An example of one such computer system 400 is shown in FIG. 1. The computer system 400 comprises a CPU 200, one or more peripherals 290, 300, 370, 390, and a universal bus 100. The CPU 200 contains circuitry for reading data and program instruction codes, decoding the instructions, and performing operations on the data according to the instructions. These operations may include steps such as, for example, moving data between peripherals and/or memory, performing mathematical operations, or making logical decisions based on the data. The peripherals 290, 300, 370, 390 may include devices such as modems, memory controllers, encryption engines, timers, input/output device controllers, and the like. Although four peripherals and one CPU are shown in the example of FIG. 1, it will be appreciated by those of ordinary skill that any number of CPUs and peripherals may be present in such computer systems. As is known, the CPU and peripherals of the computer system 400 may be organized into bus slaves and bus masters. A bus master is a device that takes control of the universal bus 100 to read data from or write data to the bus. A bus slave is a device that does not control the flow of information on the universal bus 100. Instead, it sends or receives data on the bus only in response to a request from a bus master. In accordance with the embodiment of FIG. 1, and by way of example, the CPU 200 and the peripheral 290 are bus masters, the peripherals 300, 370, 390 are bus slaves.

As is well understood, the universal bus 100 is a set of component buses that are used to transfer data between bus masters 200, 290 and bus slaves 300, 370, 390. The component buses comprise a universal control bus 102, a universal feedback bus 101, a universal address bus 103, and a universal data bus 104. The universal bus 100 can include any multiplexing, 3-stating, or decoding logic necessary to route the signals between the plurality of bus masters 200, 290 and the plurality of bus slaves 300, 370, 390.

The universal control bus 102 is used by the bus masters 200, 290 to communicate read and write signals to bus slaves 300, 370, 390. A read signal consists of data flowing from a bus slave 300, 370, 390 to a bus master 200, 290. A write signal consists of data flowing from a bus master to a bus slave. The universal control bus 102 is also used by the bus masters 200, 290 to request control of the bus, since only one bus master can be in control of the bus at any time. When multiple bus masters request control of the universal bus at the same time, a peripheral frequently referred to as a universal bus arbiter 390, mediates the various requests for control and selects a device via well known and equivalent arbitration schemes.

The universal feedback bus 101 is used by the bus slaves 300, 370, 390 to inform the bus masters 200, 290 that a read or write operation has been completed. The universal feedback bus 101 is also used by the universal bus arbiter 390 to grant control of the universal bus 100 to a particular requesting bus master.

The universal address bus 103 is used by the bus masters 200, 290 to select a particular register of a bus slave 300, 370, 390 or word in a memory module for read and write operations. The set of locations that can be addressed by the universal address bus 103 is called the address space of the computer system. Each location in the address space is assigned a numerical address. The locations within the address space are selected by applying the numerical addresses to physical address lines of the universal bus 103. The relationship between the addresses that refer to the locations in the address space and the blocks of memory associated with each peripheral in the address space is called the system memory map.

FIG. 2 shows a memory map 960 for the computer system 400 of FIG. 1. As seen from the memory map 960, an address space 950 for the computer system 400 comprises a block of memory addresses (951, 953, 955) for peripherals 300, 370, and 390 respectively. Also shown in FIG. 2 are examples of addresses that are applied to the universal address bus 103 physical address lines to select locations within the address space. Each of the universal bus 100 addresses can be split into two sections; one section selects the block of the memory map 960 for a particular peripheral, for example, the address section 961 selects the block 951 for peripheral 300; the other section selects a particular register inside the selected memory block, for example the address section 962 selects the register 952 in the block 951.

Referring back to FIG. 1, the universal data bus 104 is used by a bus master 200, 290 when it writes data to a bus slave 300, 370, 390, and is used by a bus slave 300, 370, 390 when a bus master 200, 290 reads data from the bus slave 300, 370, 390. In some computer systems, the universal data bus is a bi-directional bus that is used for both reading and writing data. In other computer systems the universal data bus 104 can be partitioned into two buses, a universal read data bus that propagates read data from the bus slaves 300, 370, 390 to the bus masters 200, 290 and a universal write data bus that propagates the write data from the bus masters 200, 290 to the bus slaves 300, 370, 390.

The central processing unit (CPU) 200 comprises a group of registers and operation units integrated together in a unitary instruction set architecture. The instruction set architecture is characterized by a set of instruction codes and the sequences of control signals generated by decoding the instruction codes, that operate on the registers and operation units in the central processing unit 200 to execute those instruction codes. In general, the CPU 200 sequentially processes a series of instruction codes that are read over the universal bus 100 from a peripheral. The processing of each instruction code causes the CPU 200 to perform actions on data contained in the registers or interact with the peripherals over the universal bus 100.

The group of registers of the CPU 200 comprises an instruction register 211, a bank of data registers 220, a bank of address registers 230, a status register 218, and a state register 219. The bank of data registers primarily comprises general purpose data registers 212, 213 that are used to hold data the CPU 200 is performing operations on. The bank of address registers comprises general purpose address registers 214, 215 and program address registers such as a program counter 216 and stack pointer 217.

The CPU 200 further comprises a control unit 250, and a set of operation units 240. The control unit 250 includes a set of control sequences 251–259. Each control sequence generates the control signals necessary to fetch, decode, and execute a particular instruction code. The operation units 241–249 are functions that combine data and address registers in some arithmetic or logical operation specified by the instruction codes.

The registers, control unit 250, and set of operation units 240 are connected by a number of buses that carry signals within the CPU 200. These buses comprise an instruction bus 201, a next state bus 206, a current state bus 207, a new status bus 203, a status bus 205, an internal control bus 202, and an internal data bus 204. All of these buses carry information in only one direction except for the internal data bus 204. The direction of data flow is indicated by the arrows in FIG. 1. The instruction bus 201 couples the instruction register 211 to the control unit 250. The next state bus 206 and the current state bus 207 connect the control unit 250 to the state register 219. The status bus 205 links the status register 218 to the control unit 250 and the set of operation units 240. The internal control bus carries signals from the control unit 250 to the status register 218, instruction register 211, data registers 220, address registers 230, and the set of operation units 240. The internal data bus 204 couples the set of operation units 240, address registers 230, and data registers 220 for bi-directional signaling.

Generally, the instruction codes that the CPU 200 executes are stored in a section of the address space called the program space. The CPU 200 reads the instruction codes from the program space one at a time. Usually, after executing an instruction code, the CPU 200 reads the instruction code having the next sequential address. The program counter 216 contains the address of the location in the memory map from where the next instruction for the CPU 200 to execute will be read. After the instruction is read, the program counter is incremented by one address. Certain instruction codes will cause the CPU 200 to jump to another address to read the next instruction code to execute. When this happens, the program counter 216 will be modified to reflect the jump in address.

The state register 219 contains the current state of the CPU 200. The current state of the CPU 200 determines which of the set of control sequences 251–259 the CPU 200 is currently executing. For example, when the CPU 200 is reading in the next instruction from a peripheral, it is in the fetch state. The fetch control sequence is executed by the control unit 250. This causes the CPU 200 to place the address currently in the program counter 216 on the universal address bus 103 and to use the universal control bus 102 to signal a read operation. The instruction code at the specified address in the memory map is loaded into the instruction register 211 and the program counter is incremented by one. The instruction code in the instruction register 211 is then loaded into the control unit 250 over the instruction bus 201. The control unit 250 decodes the instruction code and uses it to determine a new state. The new state is loaded over the next state bus 206 into the state register 219. This new state is then used to determine which of the set of control sequences 251–259 to perform. After the CPU 200 performs the actions required by an instruction code, it returns to the fetch state and loads the next instruction code.

Computing systems like the one shown in FIG. 1 can be implemented in many different ways. For example, the CPU 200 and peripherals 290, 300, 370, 390 may comprise separate integrated circuits placed on an electronic circuit board. Alternately, some of the peripherals may be devices other than integrated circuits. As still another alternative, the CPU 200 and one or more peripherals 290, 300, 370, 390 may be combined into a single integrated circuit. Such an integrated circuit containing several devices is referred to as an application specific integrated circuit or ASIC.

The CPU is usually the most expensive part of the computer system 400 of FIG. 1. This is due, in part, to the complexity and size of the CPU circuitry. If the computing device is an ASIC, the size of the CPU portion of the ASIC is directly related to the cost of the ASIC. Also, the CPU is oftentimes the largest power consumer of a computing system and the complexity of the CPU is directly related to power consumption. This is an important issue in portable computing devices that rely on a battery or in devices that derive their power from radio signals such as some smart cards. In these applications, it is important that the CPU be kept as small and simple as possible in order to produce a low cost and low power computing device.

Computer systems designers frequently make use of pre-existing CPUs and peripheral devices when designing new systems. This is especially true of the CPU since CPUs are complicated devices that are expensive to design and change. As seen in FIG. 1, CPUs typically contain numerous data registers 220, address registers 230, functional circuitry 241–249 and control registers 219, 218, 211. Based upon the application, however, a particular computer system may not need all system features and functionality. Because of this, the general purpose CPU used in many modern computer systems is oftentimes more complicated, power-consuming, and expensive than is actually required.

After a computer system has been designed, it is often necessary to modify the computing device to add new peripherals and functions. These modifications will oftentimes result in different requirements for the CPU. If the CPU can not meet these requirements and must be replaced, the cost of redesigning the computer system can be high.

In many applications of computing systems it is desirable to use a computer system for multiple applications that make use of different peripherals. However, many computer systems are manufactured with all of the instruction codes (programming) in ROM so that the computer systems can not be reprogrammed easily. In such computer systems it is impossible to adapt the computer system for the different applications once it has been manufactured.

Based on the forgoing, there is a need for a new computer system architecture; one that employs lower complexity, cost, and power consumption. The architecture should permit peripherals and functions to be added to the computer system without the need for redesign and should support multiple applications without the need for complete reprogramming.

BRIEF DESCRIPTION OF THE DRAWINGS

The foregoing and other advantages of the invention will become apparent upon reading the following detailed description and upon reference to the drawings in which:

FIG. 1 is a system block diagram depicting a computer system containing a central processing unit;

FIG. 2 shows a memory map of the computer system of FIG. 1;

FIG. 8 shows the translation from a logical memory map to a physical memory map performed by a memory mapping unit according to one embodiment of the present invention.

DETAILED DESCRIPTION OF THE PREFERRED EMBODIMENT

In one embodiment of the present invention, there is provided an integrated circuit (IC) comprising a universal bus, a central processing unit (CPU) coupled to the universal bus, and a program control unit (PCU) coupled to the universal bus for receiving signals via the universal bus only.

In another embodiment of the present invention, there is provided an application specific integrated circuit (ASIC). The ASIC comprises a universal bus, a central processing unit (CPU) coupled to the universal bus, and a program control unit (PCU) coupled to the universal bus. The CPU is coupled to the PCU without dedicated control lines.

In still another embodiment of the present invention, there is provided a micro controller comprising a universal bus having physical address lines, a central processing unit (CPU), and a program control unit (PCU). The CPU is coupled to the universal bus, has an instruction set, and employs logical addressing. The PCU has an instruction set and is coupled to the universal bus for receiving control signals from the universal bus only. The CPU is coupled to the PCU without dedicated control lines.

In still yet another embodiment of the present invention there is provided an application specific computing device having an IC, said IC comprising a universal bus, a central processing unit (CPU) coupled to the universal bus, and a program control unit (PCU) coupled to the universal bus for receiving control signals via the universal bus only.

In yet another embodiment of the present invention there is provided an integrated circuit (IC) comprising a universal bus, a central processing unit (CPU), and a memory mapping unit (MMU). The universal bus has physical address lines with associated physical addresses. The CPU employs logical addressing and is coupled to the universal bus. The MMU is slaved to the universal bus. The MMU translates logical addresses used by the CPU to physical addresses associated with the universal bus.

Figure 3:
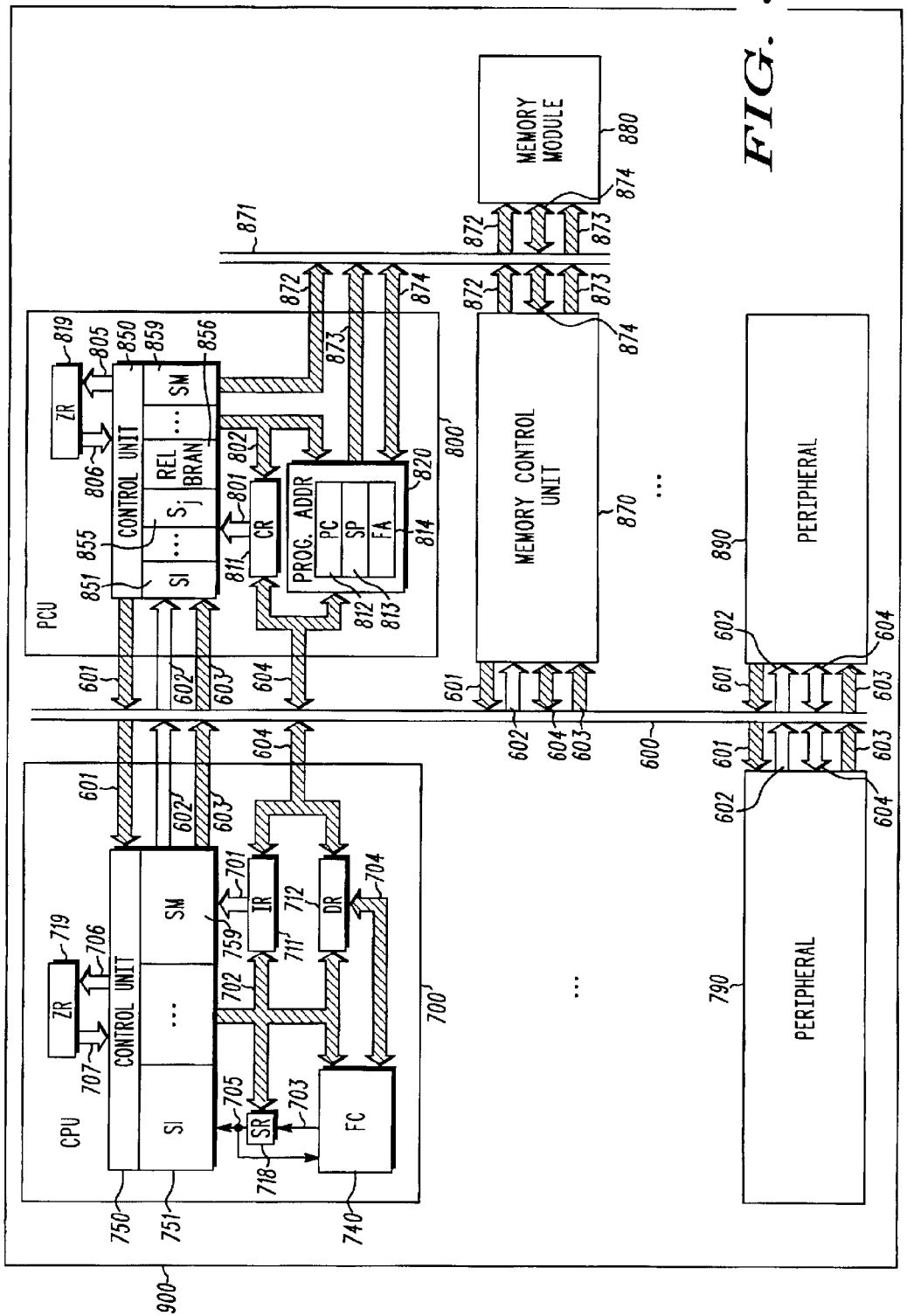
FIG. 3 is a system block diagram depicting a computer system containing a central processing unit according to one embodiment of the present invention.

Turning now to the drawing and referring to FIG. 3, there is shown a computer system 900 according to one embodiment of the present invention. The computer system 900 decouples the program address registers and program control sequences from the instruction set architecture of the central processing unit 700 and places them in a peripheral called a program control unit 800. As with the computer system 400 of the FIG. 1, the computer system 900 comprises a plurality of bus masters 700, 790 controlling a universal bus 600, and a plurality of bus slaves 800, 870, 890 being controlled by the universal bus 600.

The computer system 900 constitutes a new partitioning of the traditional central processing unit instruction set architecture. The central processing unit 700 comprises circuitry for a core set of instructions that the designer decides must be centralized. All other instructions are bundled as command sets of various peripherals, such as the program control unit 800. Breaking these instructions out as command sets in peripherals simplifies the central processing unit 700 and makes the peripheral command sets independent of the central processing unit 700. As a result, the computer system designer can build a computer system comprising only the collection of peripherals and their command sets that are absolutely necessary to meet the requirements of a specific application without the burden of a complex general purpose central processing unit as disclosed in FIG. 1. This will result in a less expensive and more flexible computer system than available using prior computer system architectures.

The universal bus 600 of FIG. 3 comprises four basic component buses, much like the universal bus 100 of FIG. 1. The component buses comprise a universal control bus 602, a universal feedback bus 601, a universal data bus 604, and a universal address bus 603. The descriptions regarding the nature of the universal bus 100 of FIG. 1 and its component buses 101, 102, 103, 104 apply equally well to the universal bus 600 of the computer system 900 and its component buses 601, 602, 603, 604, and will not therefore be repeated.

The central processing unit 700 comprises a set of registers, operation units, and control sequences. The primary purpose of the central processing unit 700 is to move instruction codes and data from peripheral to peripheral in the computer system 900. The performance of computations is left to the peripherals. The set of registers of the central processing unit 700 comprise an instruction register 711, a data register 712, a unitary status bit register 718, and a state register 719. These registers are coupled to a control unit 750 and a unitary operation unit 740 by a number of internal buses. These internal buses comprise a next state bus 706 and current state bus 707 that connect the state register 719 to the control unit 750; an internal control bus 702 that connects the control unit 750, unitary status bit register 718, unitary operation unit 740, instruction register 711, and data register 712; and an internal data bus 704 that connects the unitary operation unit 740 and the data register 712.

In accordance with the preferred embodiment, the control unit 750 is partitioned into control sequences 751–759 that fetch, decode, and execute instruction codes. When compared to the computer system of FIG. 1, the number of control sequences is smaller in size and complexity because the CPU has a relatively small number of instruction codes. In one embodiment of the present invention, the basic set of instruction codes may include load data and store data instruction codes only. The load data instruction code reads data from a bus slave peripheral 800, 870, 890 and places the data in the data register 712. The store data instruction code writes the contents of the data register 712 to a bus slave peripheral 800, 870, 890. In addition to load and store, the instruction code set may further allow bit operations/manipulations of register data Examples of such bit operations include a bit set and a bit test function. The bit set function sets or clears a particular bit in the unitary data register 712. A bit test function sets the unitary status bit 718 based on the contents of a particular bit in the unitary data register 712. The unitary status bit register 718 is used by the instruction decode and sequence unit to conditionally execute the next instruction code to be fetched. As such, it will be appreciated that most instruction codes are composed of two sections: an operation code section and an address section. The operation code section identifies what the instruction code does (i.e. load data or store data). The address section identifies what register or memory cell the operation will be performed on.

Notwithstanding the desire for simplicity, it will be appreciated by those skilled in the art, after review hereof, that other instruction code sets, registers configurations, operation units, and control sequences may be advantageously combined to develop an application specific computer system different from embodiments set forth herein, and yet without departing from the spirit of the present invention. Examples of alternative instruction codes include, but are no means limited to set instructions, which place a specified value into a peripheral register; conditional instructions, which perform actions depending on the result of a logical test; and zero instructions, which clear all bits in a specified register.

Referring back to FIG. 3, the program control unit (PCU) 800 is a slave to the universal bus 600. The task of the program control unit 800 is to maintain the program addresses and to fetch data and instruction codes from a memory module 880 when requested by a bus master. The program control unit 800 generates addresses to access the memory module 880 over a memory bus 871 based on the contents of its program address registers. The program control unit 800 comprises a control register 811, a set of program address registers and functions 820, a state register 819, a control unit 850, and a plurality of internal buses. The set of program address registers and functions 820 comprise a program counter 812, a stack pointer 813, and an operation unit 814. The control register 811, set of program address registers and functions 820, control unit 850, and operation unit 814 are linked by a number of internal buses such as an internal command bus 801, a next state bus 805, a current state bus 806, and an internal control bus 802.

During operation, the PCU 800 acquires instruction codes from the memory module 880 when a read access to the control register 811 is performed on the universal bus 600 by a bus master. The program control unit 800 interprets the read access as a trigger to read from the memory module 880. The instruction code or data read from the memory module is placed on the universal data bus 604 in response to the read access. As with the computer system 400 of FIG. 1, the instruction codes that the program control unit 800 acquires from the memory module 880 are stored in a section of the address space of the computer system 900 called the program space. Generally, when a read access is performed on the control register 811 by a bus master such as the CPU 700, the PCU 800 reads the instruction code from the program space having the next sequential address after the previously fetched instruction code. The program counter 812 contains the address of the location in the memory module from which the next instruction code will be fetched. After the instruction is fetched, the program counter 812 is incremented by one address. The program control unit 800 can also be commanded to jump to another address to fetch the next instruction code. When this happens, the program counter 812 will be modified to reflect the jump in address.

The PCU 800 and a memory control unit 870 are connected to the memory module by the memory bus 871. The memory control unit 870 performs the same functions as the memory control unit 370 of the computer system 400 of FIG. 1. The memory module 880 may comprise RAM, ROM, DRAM, EEPROM or other suitable memory storage devices. As will be appreciated, multiple memory modules may be present in the computer system 900 on the same memory bus or on separate memory buses and sharing the same or having separate memory control units. The memory bus comprises a memory control bus 872, a memory address bus 873, and a memory data bus 874.

The memory control bus 872 is used for control signaling between the PCU 800 or memory control unit 870 and the memory module 880. The memory address bus 873 is used by the PCU 800 or memory control unit 870 to choose the memory module 880 word to which a read or write operation is being performed. The memory data bus 874 is used to transfer data to or move data from the memory module 880 from the PCU 800 and memory control unit 870.

The process by which the PCU 800 fetches instruction codes for the CPU 700 from the memory module 880 shall now be described. The central processing unit 700 obtains its instruction codes from the program control unit 800 by performing a read from the control register 811. The CPU 700 performs this read operation by placing the address of the PCU 800 control register 811 onto the universal address bus 603 and control signaling on the universal control bus 602. The control unit 850 of the PCU 800 recognizes the address of the control register 811 on the universal address bus 603 and generates the appropriate control signal to read an instruction code from the memory module 880. The PCU 800 uses the address in the program counter 812 as the address in the memory module 880 to fetch the instruction code from. The PCU 800 passes the instruction code it read from the memory module 880 to the central processing unit 700 via the universal data bus 604. The control unit 850 also generates the appropriate control signals on the internal control bus 802 to make the program counter 812 increment by one word address in the memory module. The next time the central processing unit 700 fetches an instruction code from the PCU 800, the program counter 812 will be pointing to the next word in the program memory.

The central processing unit 700 can cause the PCU 800 to effect more complex program behavior by writing command codes to the PCU 800 control register 811. In one embodiment of the present invention, the CPU 700 executes a sequence of two instruction codes to transfer a command code from the program space to the PCU 800 control register 811.

First, the CPU 700 fetches a load data instruction code from the memory module 880 via the PCU 800 using the instruction fetch process described above. The load data instruction code contains the address of the PCU 800 control register 811. When executed, this instruction code causes the CPU 700 to fetch data from the memory module 880 via the PCU 800 by performing a read from the control register 811. This triggers a read of the memory module 880 just like the instruction fetch described above. However, instead of storing the instruction code sent by the PCU 800 in the instruction register 711, the CPU 700 places the instruction code into the data register 712 of the CPU 700.

As a second step, the CPU 700 fetches a store data instruction code from the memory module 880 via the PCU 800. The store data instruction code contains the address of the control register 811. When executed, this instruction code causes the CPU 700 to write the data in the data register 712 to the PCU 800 control register 811. To do this the CPU 700 places the address of the control register 811 on the universal address bus 603, the contents of the data register 712 on the universal data bus 604, and control signaling to perform a write operation on the universal control bus 602. The PCU 800 control unit 850 decodes the universal control 602 and address 603 buses to generate the internal control signals that will select the control register 811 and tell it to accept the instruction code from the universal data bus 604.

In one embodiment of the present invention, the instruction codes that can be written to the program control unit's 800 control register 811 comprise absolute branches, relative branches, subroutine calls and subroutine exits. These instruction codes cause the PCU 800 to perform operations on the program counter 812 and/or stack pointer 813 to cause a change in the location in program space where the program control unit 800 will fetch the next instruction code. The relative branch instruction code causes the PCU 800 to add an offset to the address space address stored in the program counter 812 thus causing a jump to a different location in the program space for the next instruction code fetch. The absolute branch instruction code writes a new address into the program counter 812. The subroutine instruction code causes the PCU 800 to store the existing program counter 812 value into a section of the memory module 880 called a stack and then to write a new address to the program counter 812. The subroutine exit instruction code causes the PCU 800 to retrieve the program address stored in the stack and write it to the program counter 812. The stack pointer 813 of the PCU 800 is used in the execution of both of the subroutine and subroutine exit instruction codes to keep track of the contents of the stack. The operation of memory stacks is well known in the art so the implementations of the stack operations will not be described further. In the execution of many of these instruction codes, the operation unit 814, which can perform integer additions and subtractions, is used by the PCU 800 to increment and decrement the program counter 812 and stack pointer 813.

As an example of the execution of an instruction code by a peripheral of the computer system 900, the execution of a relative branch by the PCU 800 will be briefly described. The relative branch instruction causes the PCU 800 to add an offset to the address currently in the program counter 812. This causes the program control unit 800 to fetch an instruction code that is not sequential in the program space to the last instruction code fetched when the CPU 700 request an instruction fetch. As a first step, the CPU 700 writes the relative branch command code to the PCU 800 control register 811 using the two step process outlined above. The control register 811 passes the relative branch instruction code on to the control unit 850 by the internal command bus 801. The control unit 850 interprets the instruction code that indicates a relative branch and generates the appropriate next state. The state register 819 loads this next state over the next state bus 805 and passes it back to the control unit 850 by the current state bus 806. This new state places the control unit 850 into the relative branch control sequence 856. The control sequence 856 generates the appropriate control signals on the internal control bus 802 to direct the operation unit 814 to add the relative branch offset to the contents of the program counter 812 and to load the sum into the program counter 812. The control unit 850 returns to a wait state to wait for another command. The next time the CPU 700 attempts to fetch an instruction from the PCU 800, the program counter 812 will contain the address of a new register location in the memory module 880, and program flow will continue from that new register location in the program space.

In another embodiment of the present invention the CPU 700 has a single instruction that performs both the load and store operations in one step. This would be more efficient than two separate instruction codes accessing the same address as in the two step process outlined above. It will be appreciated that there are many potential instruction coding schemes that would make efficient transfers of instruction codes from program space to the PCU 800 control register 811, or to the control register of any other peripheral. However, in all of these schemes the instruction code set of the peripheral is not dependent on the instruction code set of the CPU 700. The CPU 700 simply moves the instruction codes destined for the peripheral from the memory module 880 to the peripheral's control register.

The list of computer system peripherals that can be bus slaves is vast and well within the knowledge of those having ordinary skill. Suffice it to say, such devices may include memory storage devices (e.g. RAM, ROM, EEPROM, CDROM, DVD, hard disks, and floppy disks); communications ports, such as RS232, USB, IEEE 1394, SCSI, the ISO 7816 contacted smart card interface, and ISO 14443 contactless smart card interface; and special operation units that are needed to implement and accelerate algorithms such the Data Encryption Standard (DES), the image compression method of the Joint Photographic Expert Group (JPEG), and the compression method of the Moving Picture Expert Group (MPEG). Of course there are many other conceivable bus slave peripherals; additional examples include, but are not limited to, PCUs, Arithmetic Logic Units (ALUs), Cyclic Redundancy Checkers (CRCs), Data Encryption Standard (DES) engines, data transceivers, Secure Memory Units (SMUs), Memory Mapping Units (MMUs), Data registers, Data stores, and other memory storage devices and their reasonable equivalences.

Figure 4:
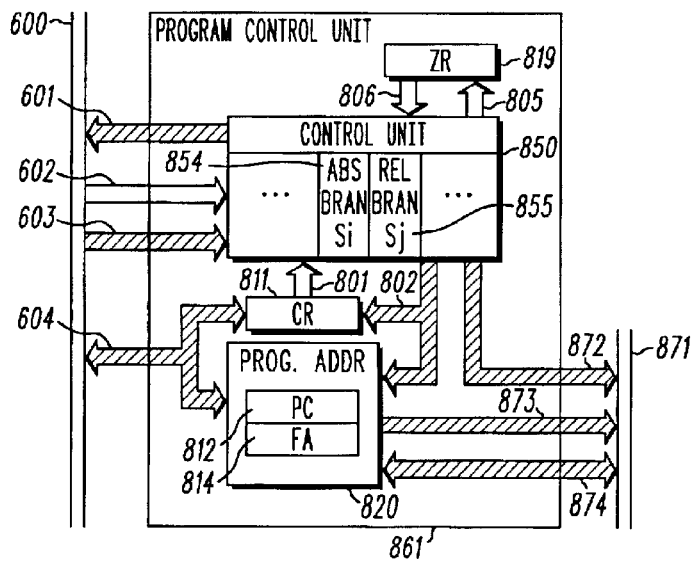
FIG. 4 is a system block diagram depicting a program control unit according to one embodiment of the present invention.
Figure 5:
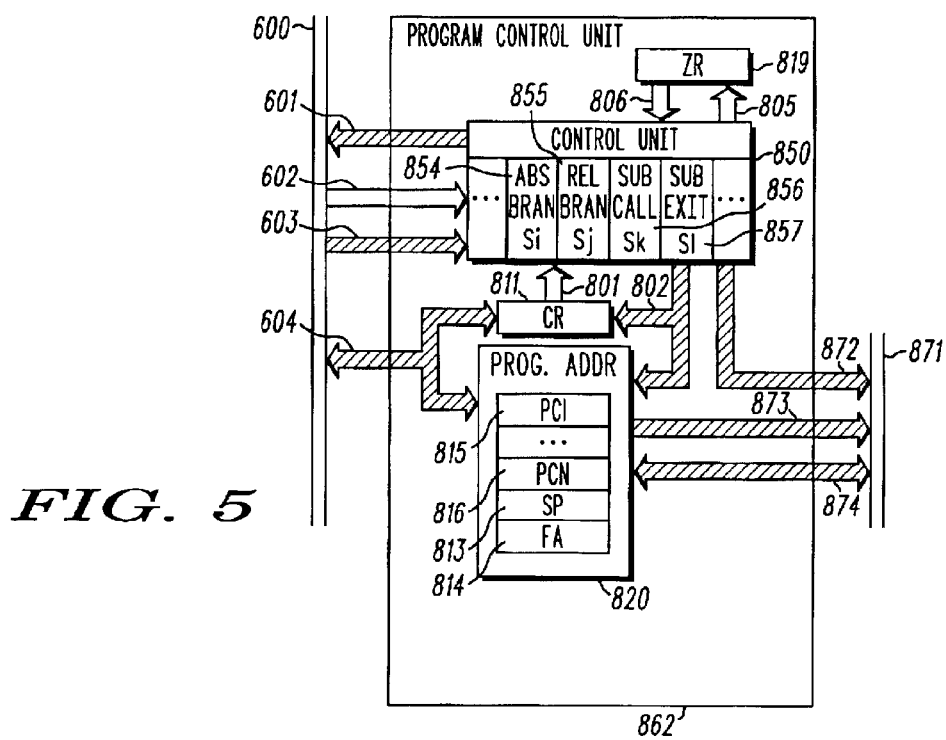
FIG. 5 is a system block diagram depicting a program control unit according to one embodiment of the present invention.
Figure 6:
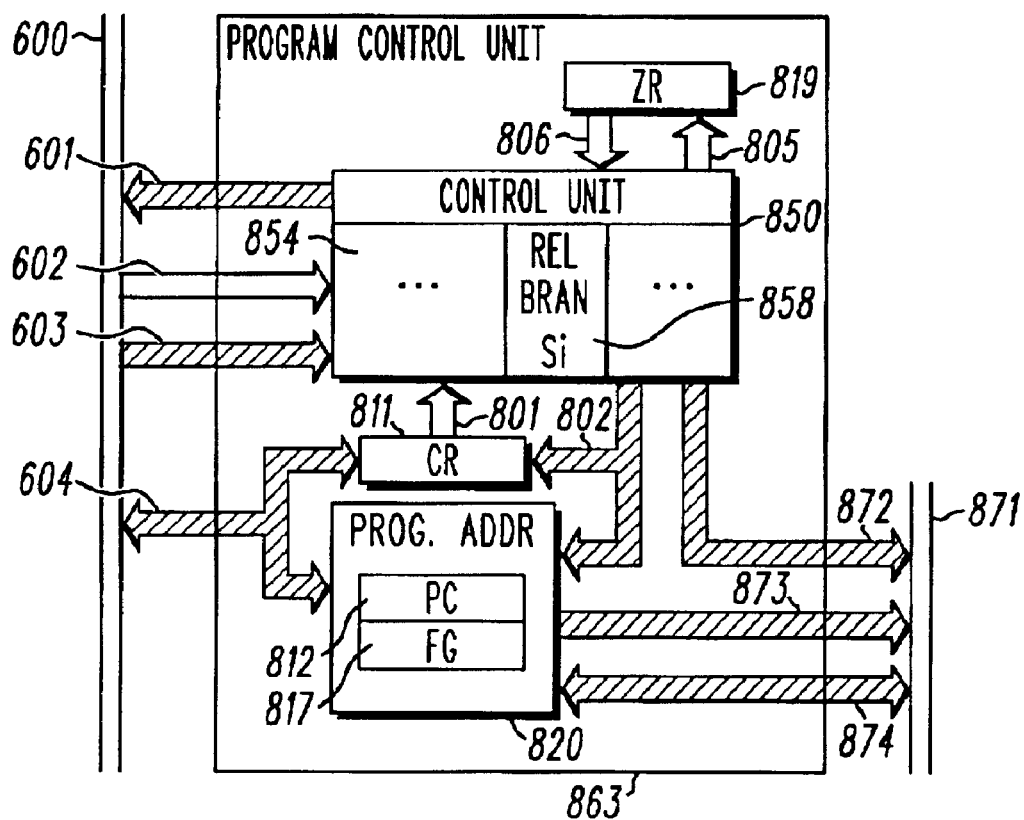
FIG. 6 is a system block diagram depicting a program control unit according to one embodiment of the present invention.

There is shown in FIGS. 4–6 alternate program control units for use in other embodiments of the present invention. Each of these program control units could replace the program control unit 800 in the computer system 900 of FIG. 3. These alternate program control units illustrate how the functions and capabilities of the computer system 900 can be changed without redesigning the CPU 700. This allows for greater flexibility and lower cost than computer systems with the traditional architecture of FIG. 1. These three alternative program control units shall be briefly described by contrasting them with program control unit 800 of FIG. 3.

A PCU 861 of FIG. 4 contains all of the components of the PCU 800 of FIG. 3 except for the stack pointer 813. As mentioned above, the stack pointer is used by the PCU 800 to execute subroutine instruction codes. Not all computer systems have the need to do subroutines. In this case, the stack pointer is not required and may therefore be eliminated. In accordance with the architecture of the present invention, which separates the program control unit from the central processing unit, the computer system can be designed without a stack pointer thereby resulting in a lower cost system.

With reference to FIG. 5, PCU 862 includes a set of program counters 815–816. The program control unit 862 uses the set of program counters 815–816 to implement a stack rather than using a portion of the memory module 880. This is useful because in many computer systems the memory module 880 is ROM while the stack must be RAM since the PCU writes data to the stack. The computer system designer may not always be able to afford the luxury and expense of adding RAM memory for a stack but may still need to implement a stack for subroutine calls. Using the set of program counters 815–816 in accordance with the PCU 862 of FIG. 5 to implement the stack can result in a less costly computer system.

With reference to FIG. 6, PCU 863 employs a similar design to PCU 861 of FIG. 4 with the addition of a grey code function unit 858. The PCU 863 uses the grey code function unit 858 to advance the program counter 812 rather than using an integer addition and subtraction unit 814 as in the PCU 800 of FIG. 3. By way of explanation, a grey code is a sequence of binary codes that advance by only changing one bit in the current binary code to get the next binary code. This type of code sequence could be used to implement a power efficient counter such as the program counter 812. The power used by a digital device is primarily dependent on the number of digital signals switching from one voltage level to another at any one time. The fewer signals switching, the less power consumed. Since a grey code counter advances by switching only one bit in the code at a time, the power consumed by this method should be less than that of a typical integer counter as used in the PCU 800 of FIG. 3. In a computer system that is power sensitive this grey code program counter methodology may prove very desirable.

Again, It will be appreciated by those skilled in the art, after review hereof, that several alternative program control unit designs will be available under the present invention, by separating the program control functions from a central processing unit and slaving these program control functions to a universal bus as a peripheral. The type of program controls implemented in such a program control unit are entirely up to the computer system designer and the specific requirements of the computer system and its application. It will likewise be appreciated, that the various functions of the CPU can similarly be divided among multiple reduced complexity peripherals. In any such embodiment, the instruction set of each of the plurality of peripherals will be independent of the instruction set of the CPU. This allows the instruction sets of the peripherals to be altered without changing the instruction set of the CPU.

In accordance with these alternatives, there exists the need to map logical addresses as used by the CPU to the physical addresses associated with the universal bus. A logical address is an address that is used by the CPU or PCU to represent a register of a peripheral or a word in a memory module. Logical addresses are used in the address section of the CPU or PCU instruction codes. A physical address is an address that can be used on an address bus to select a location on the bus. In operation, when a bus master performs a read or write operation to a register of a bus slave or word in a memory module, the bus master places the physical address of the register or memory word on the address lines of the address bus. The bus slave or memory module recognizes the physical address on the address bus as addressing one of its registers or words so that it knows to perform an action. Conversely, if an instruction code commands the CPU to perform a read operation from a register in a peripheral, the instruction code will contain the logical address of the register in its address section. Typically, the logical and physical addresses for peripheral registers and memory cells are different. When they are different, the logical addresses must be mapped to physical addresses before they can be used on the address bus.

The use of logical addresses in instruction codes that are different from physical addresses used on the address bus is viewed as advantageous since the person who writes the instruction codes (the programmer) does not need knowledge of the physical addresses used in the computer system. This allows the same instruction codes to be reused in different computer systems. In accordance, the address mapping concept of the present invention can be used to swap peripherals in a computer system without the need to change the instruction codes in memory. By way of example, a computer system architect could elect between using two different peripherals without the need to make changes to the computer system's instruction codes.

Figure 7:
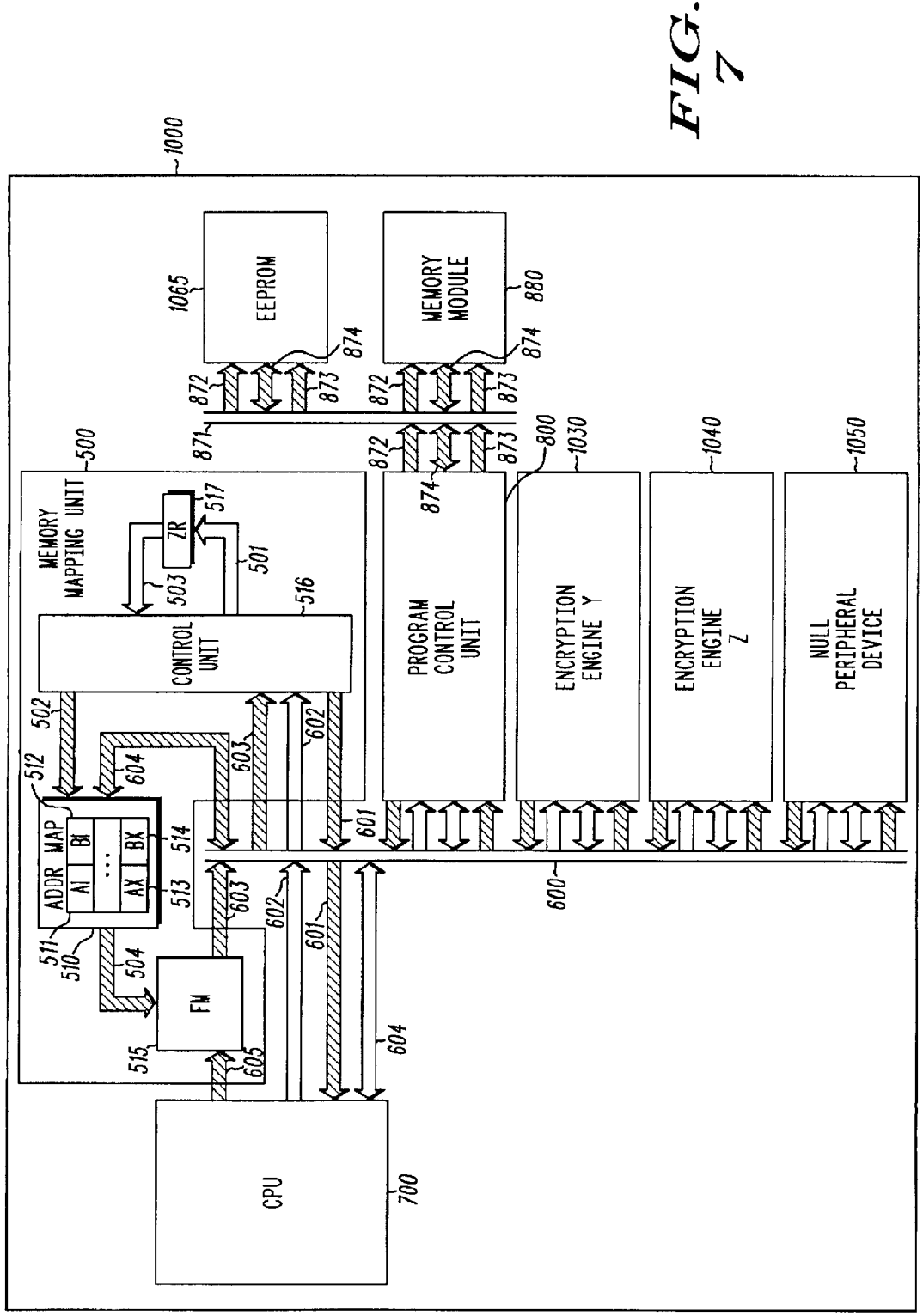
FIG. 7 is a system block diagram depicting a computer system containing a memory mapping unit in accordance with one embodiment of the present invention.

There is shown in FIG. 7 a computer system 1000 that contains a memory mapping unit (MMU) 500, which performs such a peripheral swapping function according to one embodiment of the present invention. This MMU 500 translates the logical addresses used by a CPU 700 to the physical addresses of a universal address bus 603. This allows the computer system 1000 to be easily configured to choose among multiple peripherals without changing any of the hardware or software of the computer system.

The computer system 1000 comprises the MMU 500, the CPU 700; a PCU 800; two encryption engines 1030, 1040; a null peripheral device 1050; a memory module 880; a EEPROM 1065; a universal bus 600; and a memory bus 871. The CPU 700, PCU 800, memory module 880, universal bus 600, and memory bus 871 are substantially similar to and perform the same functions as the like named components in the computer system 900 of FIG. 3. The two encryption engines 1030, 1040 are bus slaves that perform encryption of data passed to them over the universal bus 600 using two different encryption algorithms. Encryption algorithms and the devices that perform them are well known in the art. The null peripheral 1050 performs no operation on data passed to it. The EEPROM 1065 is an electrically programmable read only memory device that is accessed over the memory bus 871.

The MMU 500 comprises a set of address mapping register pairs 510, a mapping function 515, a control unit 516, and a state register 517. The set of address mapping register pairs 510 define the translation from logical addresses to physical addresses. The registers are arranged in pairs, with logical address registers 511, 513, matched to physical address registers 512, 514. The mapping function 515 compares the incoming logical addresses from the CPU 700 on a central processing unit address bus 605 to the contents of the logical address registers 511, 513 that it receives via an internal data bus 504 The mapping function 515 chooses the contents of the physical address registers 512, 514 based on the comparison to generate the physical addresses to place on the universal address bus 603. For example, if the logical address from the CPU 700 matches the contents of logical address register 511, the physical address in the physical address register 512 will be applied to the universal address bus 603. If the logical address from the CPU 700 matches the contents of the logical address register 513, the address in the physical address register 514 will be placed on the universal address bus 603.

The control unit 516 of the MMU 500 decodes the signals from the universal control bus 602 and the universal address bus 603 to read and write addresses into the set of address mapping register pairs 510. It uses an internal control bus 502 to select the appropriate pair of address register pairs for the bus access. In one embodiment of the present invention, the control unit 516 has only one sequence of states that handles the bus cycle for reads and writes. The state register 517 accepts the next state from a next state bus 501 and delivers the current state via a current state bus 503. The control unit 516 generates the appropriate feedback on the universal feedback bus 601 at the end of the bus cycle. In other embodiments of the present invention the control unit 516 may have other states with other capabilities.

In the MMU 500, a new address map can be loaded into the address mapping register pairs 510 while the computer system 1000 is running. An address map of logical to physical address mappings could be stored in the EEPROM 1065 on the memory bus 871. A sequence of load and store instruction codes in the memory module 880 instructs the central processing unit 700 to load the address map from the EEPROM and write it to the MMU 500. The MMU 500 then stores the address map into the set of address mapping register pairs 510.

One example of the use of a computer system using a MMU is switching between multiple encryption engines in a smart card. Encryption engines are peripherals used for securing private and financial information stored on the smart card. Often different smart card applications will use different encryption schemes requiring the use of different encryption engines. A memory mapping unit can be used to switch between the encryption engines. The address map in the EEPROM is stored in the smart card during an initialization and personalization process before the smart card is issued to a user. The application instruction codes stored in a ROM memory module use a driver routine (group of instruction codes that operate a peripheral) common to all the encryption engines with a common logical address representing the location of the encryption engine in the logical address space. The memory mapping unit translates this logical address to the physical address of the particular encryption engine selected for use by the application. If the smart card is to be used in a low security environment where encryption is not needed, encryption could be turned off by mapping the logical address of the encryption engine to a null peripheral. The null peripheral would have registers to store the data written to it, but it would perform no encryption on that data.

As explained above in regard to the computer system 900 of FIG. 3, the set of locations that can be addressed by the universal address bus 603 of the universal bus 600 is called the address space of the computer system 1000. In a similar manner, the logical addresses of the addressable locations are referred to as the logical address space and the physical addresses of the addressable locations are called the physical address space. In the computer system 1000, the two encryption peripherals 1030, 1040 and the null peripheral 1050 share the same addresses in the logical address space but different addresses in the physical address space.

Three possible mappings from the location of the encryption peripherals 1030, 1040, or null peripheral 1050 in the logical address space 959 to a location in the physical address space 970 are illustrated in FIG. 8. The CPU 700 executes instruction codes that are fetched from the memory module 880. When these instruction codes require the CPU 700 to read or write data to the encryption peripherals, they use a logical address from the logical address space. This logical address consists of a logical peripheral address section 967, which selects the encryption peripheral 957 in the logical address space 959, and a logical location address section 968, which selects location (register) 958 inside the encryption peripheral. FIG. 8 shows three potential physical addresses to which the logical address of the encryption peripheral can be mapped by the MMU 500. The physical peripheral address section 981 selects the physical address of the first encryption engine 891, and the physical location address section 982 selects register 892 inside the first encryption engine. The physical peripheral address section 983 selects the physical location of the second encryption engine 893, and the physical location address section 984 selects the register 894 inside the second encryption engine. The physical peripheral address section 985 selects the physical location of the null peripheral 895, and the physical location address section 986 selects the register 896 inside the null peripheral.

The MMU 500 contains address mapping register pairs, as described above, one of which can be used to map the logical address of the encryption engine in the instruction codes to one of the three possible peripherals in the physical address space. In one embodiment of the present invention, the address mapping register pairs store only the logical peripheral address sections and the physical peripheral address sections. The logical register address section 968 is exactly equal to the physical register addresses section 982, 984, and 986 and therefore does not need to be mapped. With the logical peripheral address section 967 and the physical peripheral address section 981 stored as an address mapping register pair 991, the logical encryption peripheral 957 is mapped to the physical encryption peripheral 891. With the logical peripheral address section 967 and the physical peripheral address section 983 stored as an address mapping register pair 992, the logical encryption peripheral 957 is mapped to the physical encryption peripheral 893. With the logical peripheral address section 967 and the physical peripheral address section 985 stored as an address mapping register pair 993, the logical encryption peripheral 957 is mapped to the physical null peripheral 895. It will be appreciated that in other embodiments of the present invention the address mapping register pairs store the entire logical and physical addresses rather than just the peripheral sections of the addresses.

With this MMU 500, a computer system 1000 with a variety of peripherals of interchangeable functions can be configured to select the peripherals needed for a particular application of the computer system 1000 while using the same set of instruction codes. If the computer system 1000 is on an integrated circuit, the set of instruction codes which the CPU 700 and PCU 800 execute are oftentimes in ROM. If the computer system 1000 had no memory mapping unit 500, it would be unable to select among the multiple peripherals since the addresses in the instruction codes could not be mapped to different peripherals. Hence the presence of the MMU 500 increases the flexibility of the computer system 1000. The presence of a memory mapping unit also allows one computer system to be used for multiple applications thereby reducing the number of different computer systems that must be designed and manufactured. This results in lower cost computer systems.

It will be appreciated that a MMU 500 can be used to choose among virtually any set of peripherals in other embodiments of the present invention. For example, in another embodiment of the present invention, the computer system 1000 could be required to perform a simple average of data in one application and a complex statistical analysis in another. The computer system could have a first peripheral that performs the average calculation and another peripheral that performs the statistical analysis. The MMU 500 could be used to choose either the averaging or the statistical analysis peripheral depending on the application.

While the computer system 1000 employing the memory mapping unit 500 contains both a CPU 700 and PCU 800, it will be appreciated that computer systems need not employ a PCU. Also, in other embodiments of the present invention the MMU 500 can map logical to physical addresses for bus masters other than a CPU. In general, computer systems in other embodiments of the present invention may contain any number and types of peripherals.

While the present invention could be applied to any conceivable computer system, it is especially useful for application specific computing devices. These devices can include smart cards, calculators, personal organizers, personal communicators, consumer electronic devices, home and office equipment/appliances, readers/scanners, wireless control units, and the combinations thereof.

One application of the present invention is for a smart card integrated circuit. The smart card market has a special need for low cost integrated circuits that implement specialized functions. An integrated circuit with a central processing unit reduced in complexity by the present invention, and with all other operational units implemented as peripherals, is ideal for a low cost smart card.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An integrated circuit (IC) comprising:
    a universal bus;
    a central processing unit (CPU) coupled to the universal bus; and
    a program control unit (PCU) comprising at least one program address register coupled to the universal bus for receiving control signals via the universal bus only.

2. The IC of claim 1 further comprising a plurality of CPUs coupled to the universal bus.

3. The IC of claim 2 wherein at least one of the plurality of CPUs controls the universal bus at a moment in time.

4. The IC of claim 1 further comprising a plurality of peripheral devices coupled to the universal bus.

5. The IC of claim 4 wherein the plurality of peripheral devices are selected from the group consisting of: PCUs, Arithmetic Logic Units (ALUs), Cyclic Redundancy Checkers (CRCs), Data Encryption Standard (DES) engines, data transceivers, Secure Memory Units (SMUs), Memory Mapping Units (MMUs), Data registers, Data stores, and other memory storage devices.

6. The IC of claim 4 wherein the plurality of peripheral devices are slaved to the universal bus.

7. The IC of claim 1 wherein the PCU has at least one instruction set and the CPU has at least one instruction set.

8. The IC of claim 7 wherein the at least one PCU instruction set is stored separately from the at least one CPU instruction set.

9. The IC of claim 8 wherein the PCU instruction set can be altered without altering the CPU instruction set.

10. The IC of claim 1 further comprising a memory module coupled to the PCU via a memory bus.

11. An application specific integrated circuit (ASIC) comprising:
    a universal bus;
    a central processing unit (CPU) coupled to the universal bus; and
    a program control unit (PCU) comprising at least one program address register coupled to the universal bus,
    wherein, the CPU is coupled to the PCU without dedicated control lines.

12. The ASIC of claim 11 further comprising a memory mapping unit (MMU) slaved to the universal bus, said MMU translates logical addresses used by the CPU to physical addresses.

13. The ASIC of claim 11 wherein the CPU communicates with the PCU by way of the universal bus only.

14. The ASIC of claim 11 further comprising a memory module coupled to the PCU via a memory bus.

15. A micro controller comprising:
    a universal bus having physical address lines;
    a central processing unit (CPU) having an instruction set and employing logical addressing, coupled to the bus; and
    a program control unit (PCU) having an instruction set and comprising at least one program address register, coupled to the universal bus for receiving control signals from the bus only,
    wherein, the CPU is coupled to the PCU without dedicated control lines.

16. The micro controller of claim 15 wherein the PCU instruction set is stored separately from CPU instruction set.

17. The micro controller of claim 15 wherein the PCU instruction set can be altered without altering the CPU instruction set.

18. The micro controller of claim 15 further comprising a memory module coupled to the PCU via a memory bus.

19. An application specific computing device having an IC, said IC comprising:
    a universal bus;
    a central processing unit (CPU) coupled to the universal bus; and
    a program control unit (PCU) comprising at least one program address register coupled to the universal bus for receiving control signals via the universal bus only.

20. The device of claim 19 wherein the PCU has an instruction set and the CPU has an instruction set, the PCU instruction set being stored and maintained separately from the CPU instruction set.

21. The device of claim 20 wherein the PCU instruction set can be altered without altering the CPU instruction set.

22. The device of claim 19 wherein the CPU is coupled to the PCU without dedicated control lines.

23. The IC of claim 19 further comprising a plurality of CPUs coupled to the universal bus.

24. The IC of claim 19 further comprising a plurality of peripheral devices coupled to the universal bus.

25. The device of claim 19 being selected from the group of devices consisting of smartcards, calculators, personal organizers, personal communicators, consumer electronic devices, home and office equipment/appliances, readers/scanners, wireless control units, and the combinations thereof.

26. The IC of claim 19 further comprising a memory module coupled to the PCU via a memory bus.

27. An integrated circuit (IC) comprising:
    a universal bus having physical address lines with associated physical addresses;
    a central processing unit (CPU) that employs logical addressing and is coupled to the universal bus;
    a program control unit (PCU) comprising at least one program address register coupled to the universal bus; and
    a memory mapping unit (MMU) slaved to the universal bus
    wherein the MMU translates logical addresses used by the CPU to physical addresses associated with the universal bus.

* * * * *